(12) United States Patent
Wong et al.

(10) Patent No.: US 12,141,701 B2
(45) Date of Patent: Nov. 12, 2024

(54) CHANNEL SCALING: A SCALE-AND-SELECT APPROACH FOR SELECTIVE TRANSFER LEARNING

(71) Applicant: International Business Machines Corporation, Armonk, NY (US)

(72) Inventors: Chun Lok Wong, San Jose, CA (US); Mehdi Moradi, San Jose, CA (US); Satyananda Kashyap, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 968 days.

(21) Appl. No.: 17/153,895

(22) Filed: Jan. 21, 2021

(65) Prior Publication Data

US 2022/0230068 A1  Jul. 21, 2022

(51) Int. Cl.
*G06N 3/084* (2023.01)
*G06N 3/04* (2023.01)
*G06F 18/21* (2023.01)

(52) U.S. Cl.
CPC ............... *G06N 3/084* (2013.01); *G06N 3/04* (2013.01); *G06F 18/21* (2023.01)

(58) Field of Classification Search
CPC ........... G06N 3/04; G06N 3/084; G06F 18/21
See application file for complete search history.

(56) References Cited

U.S. PATENT DOCUMENTS

| 10,572,773 | B2 | 2/2020 | Yehezkel Rohekar | |
|---|---|---|---|---|
| 10,582,907 | B2 | 3/2020 | Chen | |
| 2019/0205606 | A1 | 7/2019 | Zhou | |
| 2020/0082268 | A1* | 3/2020 | Chiu | G06N 3/048 |
| 2020/0210844 | A1* | 7/2020 | Gao | G06N 3/082 |
| 2020/0357045 | A1* | 11/2020 | Guo | G06N 3/063 |
| 2020/0394520 | A1* | 12/2020 | Kruglov | G06N 3/045 |
| 2022/0004849 | A1* | 1/2022 | Chen | G06T 5/70 |

OTHER PUBLICATIONS

Chiu et al., C2S2: Cost-aware Channel Sparse Selection for Progressive Network Pruning, Apr. 2019. (Year: 2019).*

(Continued)

*Primary Examiner* — Marshall L Werner
(74) *Attorney, Agent, or Firm* — Shackelford, McKinley & Norton, LLP

(57) ABSTRACT

A computer-implemented method, a computer program product, and a computer system for introducing channel-scaling layers in a deep neural network. A computer receives a pre-trained deep neural network including convolutional layers followed by respective ones of activation layers, adds channel-scaling layers after the respective ones of the activation layers, where each of the channel-scaling layers includes scaling weights. The computer trains the scaling weights in the channel-scale layers. The computer removes, in the convolutional layers, channels whose corresponding scaling weights are lower than a predetermined threshold. The computer removes the channel-scaling layers. In response to determining that at least one convergence criterion is met, the computer provides a finally trained deep neural network.

18 Claims, 10 Drawing Sheets

(56) References Cited

OTHER PUBLICATIONS

"Image Moderation Using Machine Learning", An IP.com Prior Art Database Technical Disclosure, Disclosed Anonymously, IP.com No. IPCOM000252007D, IP.com Electronic Publication Date: Dec. 13, 2017, 35 pages.

"Method and System for Automatic Labelling and Guidance of Abdominal Anatomy Using Iterative Transfer Learning Neural Network", An IP.com Prior Art Database Technical Disclosure, Disclosed Anonymously, IP.com No. IPCOM000260563D, IP.com Electronic Publication Date: Dec. 6, 2019, 10 pages.

Cheng et al., "A Survey of Model Compression and Acceleration for Deep Neural Networks", IEEE Signal Processing Magazine, Special Issue on Deep Learning for Image Understanding, arXiv:1710.09282v9, Jun. 14, 2020, 10 pages.

Dryden, et al., "Channel and Filter Parallelism for Large-Scale CNN Training", SC '19, Nov. 17-22, 2019, 20 pages.

Frankle, et al., "The Lottery Ticket Hypothesis: Finding Sparse, Trainable Neural Networks", arXiv:1803.03635v4, Nov. 27, 2018, 39 pages.

Guo, et al., "SpotTune: Transfer Learning through Adaptive Fine-tuning", Proceedings of the IEEE Conference on Computer Vision and Pattern Recognition (CVPR), 2019, 10 pages.

Kong, et al., "Method and System for Utilizing Convolutional Neural Network for Predicting Click-Through Rate (CTR)", An IP.com Prior Art Database Technical Disclosure, IP.com No. PCOM000251880D, IP.com Electronic Publication Date: Dec. 8, 2017, 6 pages.

Liu, et al., "STGAN: A Unified Selective Transfer Network for Arbitrary Image Attribute Editing", Computer Vision and Pattern Recognition, 2019, 10 pages.

Mell, et al., "The NIST Definition of Cloud Computing", National Institute of Standards and Technology, Special Publication 800-145, Sep. 2011, 7 pages.

Molchanov, et al., "Pruning Convolutional Neural Networks for Resource Efficient Inference", Conference Paper at ICLR 2017, arXiv:1611.06440v2, Jun. 8, 2017, 17 pages.

Schwartz, et al., "Green AI", arXiv:1907.10597v3, Aug. 13, 2019, 12 pages.

Wang, et al., "Learning for Scale-Arbitrary Super-Resolution from Scale-Specific Networks", arXiv:2004.03791v1, Apr. 8, 2020, 17 pages.

Wong, et al., "SegNAS3D: Network Architecture Search with Derivative-Free Global Optimization for 3D Image Segmentation", arXiv:1909.05962v1, Sep. 12, 2019, 9 pages.

Zoph, et al., "Neural Architecture Search With Reinforcement Learning", arXiv:1611.01578v1, Nov. 5, 2016, 15 pages.

\* cited by examiner

CHANNEL SCALING: A SCALE-AND-SELECT APPROACH FOR SELECTIVE TRANSFER LEARNING

BACKGROUND

The present invention relates generally to transfer learning for image interpretation, and more particularly to a network architecture with channel-scaling layers for selective transfer learning.

The area of automatic medical image interpretation has witnessed a major transformation with the increased popularity of deep learning. For medical image classification, in the absence of large training sets of annotated medical images, transfer learning which uses models pre-trained on large datasets such as the ImageNet is a common approach. If the size of the available target dataset is small, researchers can manually select and freeze some layers, usually the low-level ones, to provide pre-trained features for the subsequent trainable layers. If the size of the target dataset is large enough, some or all layers can be fine-tuned for better performance. In fact, as fine-tuning usually involves modifications of millions of parameters, it requires an amount of data which is usually unavailable in medical imaging. Furthermore, regardless of the more complicated procedures, the performance gained by fine-tuning can be limited especially on large datasets. As a result, transfer learning in medical imaging is usually used without fine-tuning and a bulk of pre-trained layers are used without detailed selections.

Although this type of transfer learning can simplify the training of new classifiers, there are two shortcomings. First, the wholesale use of large neural networks trained on the ImageNet most likely results in unnecessarily large models, and this is unfavorable for applications running on the cloud or mobile devices. Second, the bulk of feature channels pre-trained on natural images without detailed selections may reduce the explainability in medical applications. The features driving the performance on medical images may be a subset of the thousands of feature channels within the network. Without removing the unnecessary feature channels, it can be difficult to perform channel-level investigations to understand the impact of each channel on the results. This creates an obstacle for the use of these classifiers in products and services that require regulatory reviews. In fact, the black-box nature of deep learning in general, and of transfer learning in particular, as a solution to avoid feature engineering can hinder the widespread use of artificial intelligence in radiology.

To select the appropriate channels for a specific problem, network pruning is used in the computer vision community. Network pruning can reduce the numbers of parameters by 90% without harming the network performance. In general, network pruning involves the iterations of three main steps: evaluating the importance of feature channels, removing less important channels, and fine-tuning. As mentioned above, fine-tuning requires a relatively large amount of data that may not be available in medical imaging. Moreover, iterations with fine-tuning gradually modify the weights of the feature channels, and this can reduce the reusability of the selected channels on similar problems. Another approach in adaptive transfer learning targets layer by layer tuning and selection using a policy network.

SUMMARY

In one aspect, a computer-implemented method for introducing channel-scaling layers in a deep neural network is provided. The computer-implemented method includes receiving a pre-trained deep neural network, the pre-trained deep neural network including convolutional layers, where the convolutional layers are followed by respective ones of activation layers. The computer-implemented method further includes adding channel-scaling layers after the respective ones of the activation layers, where each of the channel-scaling layers includes scaling weights. The computer-implemented method further includes training the scaling weights in the channel-scale layers. The computer-implemented method further includes removing, in the convolutional layers, channels whose corresponding scaling weights are lower than a predetermined threshold. The computer-implemented method further includes removing the channel-scaling layers. The computer-implemented method further includes, in response to determining that at least one convergence criterion is met, providing a finally trained deep neural network.

In another aspect, a computer program product for introducing channel-scaling layers in a deep neural network is provided. The computer program product comprises a computer readable storage medium having program instructions embodied therewith, and the program instructions are executable by one or more processors. The program instructions are executable to: receive a pre-trained deep neural network, the pre-trained deep neural network including convolutional layers, where the convolutional layers are followed by respective ones of activation layers; add channel-scaling layers after the respective ones of the activation layers, where each of the channel-scaling layers includes scaling weights; train the scaling weights in the channel-scale layers; remove, in respective ones of the convolutional layers, channels whose corresponding scaling weights are lower than a predetermined threshold; remove the channel-scaling layers. In response to determining that at least one convergence criterion is met, the program instructions are further executable to provide a finally trained deep neural network.

In yet another aspect, a computer system for introducing channel-scaling layers in a deep neural network is provided. The computer system comprises one or more processors, one or more computer readable tangible storage devices, and program instructions stored on at least one of the one or more computer readable tangible storage devices for execution by at least one of the one or more processors. The program instructions are executable to receive a pre-trained deep neural network, the pre-trained deep neural network including convolutional layers, where the convolutional layers are followed by respective ones of activation layers. The program instructions are further executable to add channel-scaling layers after the respective ones of the activation layers, where each of the channel-scaling layers includes scaling weights. The program instructions are further executable to train the scaling weights in the channel-scale layers. The program instructions are further executable to remove, in the convolutional layers, channels whose corresponding scaling weights are lower than a predetermined threshold. The program instructions are further executable to remove the channel-scaling layers. The program instructions are further executable to, in response to determining that at least one convergence criterion is met, provide a finally trained deep neural network.

DETAILED DESCRIPTION

Figure 1A:
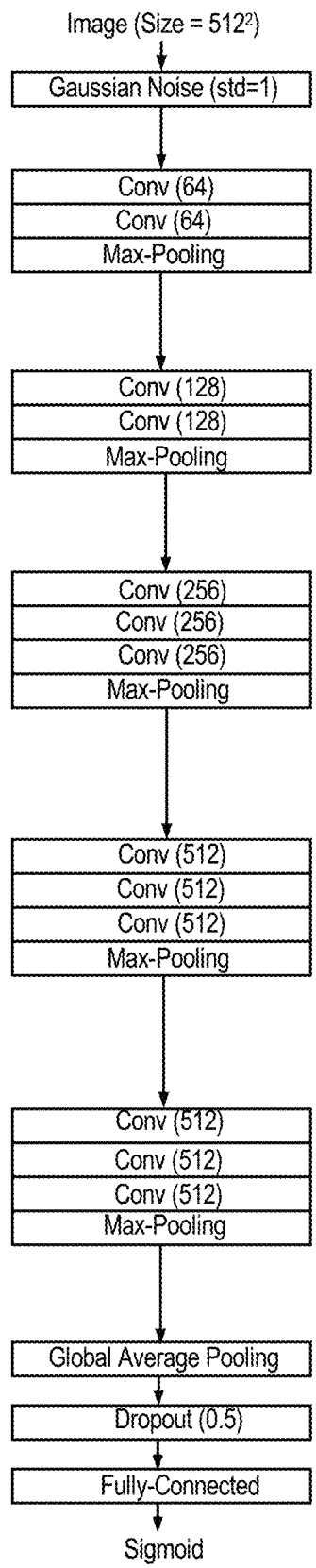
FIG. 1(A) is a diagram illustrating a baseline network architecture with pre-trained convolutional layers.

Embodiments of the present invention disclose a new approach for transfer learning that allows feature channel selections, without changing the values of the original weights of the neural network. The core idea is the introduction of the concept of a channel-scaling layer. The channel-scaling layer is added after each frozen convolutional layer to infer the importance of each channel, with scaling weights trainable by backpropagation. This core idea is originated by modeling the channel selection problem as a binary optimization problem in which the selection of a channel is indicated by a binary index. This approach is computationally infeasible; therefore, in embodiments of the present invention, the binary constraint is relaxed and thresholding to enable selection is added. Using a target dataset, a computer or server trains the scaling weights and removes channels by applying a threshold to the weights for multiple iterations. In one embodiment, a computer or server applies L1 regularization on each channel-scaling layer to increase the sparsity of the learned model.

Since there are thousands of convolutional feature channels even for relatively small networks, e.g., 4,224 for VGG16 (which is a convolutional neural network architecture), selecting the appropriate channels for transfer leaning is a difficult task. While the most common approach is selecting the layers with low-level features, this may include some unnecessary low-level channels and discard some useful high-level channels. Although more comprehensive approaches of network pruning are promising on reducing the network size when maintaining the accuracy, the required fine-tuning process can be computationally expensive and data demanding. Embodiments of the present invention formulate the channel selection problem as an optimization problem. Let c be the total number of convolutional channels of a pre-trained network, the goal of the optimization problem is to find a c-dimensional binary vector $s \in \{0, 1\}^c$ (i.e., $2^c$ combinations) that indicates which channels to be kept for optimal performance. Similar to neural architecture search, each iteration of updating s requires a network training, thus this approach is computationally infeasible as c is usually large. To address these issues, embodiments of the present invention propose a framework using backpropagation for training millions of parameters; therefore, embodiments of the present invention provide an approach for computationally feasible feature selection.

To select the channels of a pre-trained network with reduced computational complexity and data size requirement, embodiments of the present invention introduce simple but effective channel-scaling layers. For the optimization problem mentioned above, by relaxing the requirement from $s \in \{0, 1\}^c$ to $s \in [0, 1]^c$ (i.e., from binary to real numbers between 0 and 1), the present invention can utilize backpropagation to obtain s. A channel-scaling layer which takes input from a frozen (non-trainable) pre-trained convolutional layer l with $c_l$ feature channels is given as:

$$\hat{x} = \text{ChannelScaling}(x; s_l) = [s_{l1}, \ldots, s_{lc_l} x_{cl}]$$

where x and $\hat{x} \in \mathbb{R}^{h \times w \times c_l}$ are the input and output feature tensors, respectively, and $x_i \in \mathbb{R}^{h \times w}$ contains the spatial features of channel i. $s_l = (s_{l1}, \ldots, s_{lc_l}) \in [0, 1]^{c_l}$ comprises the scaling weights trainable by backpropagation, and each $x_i$ is rescaled by $s_{li}$ to produce $\hat{x}_i$. L1 regularization can also be imposed on each channel-scaling layer to increase the sparsity of the learned $s_l$. Therefore, by training a network augmented by channel-scaling layers, each channel-scaling layer can learn the relative importance of the channels in its corresponding convolutional layer, and s can be obtained by concatenating all $s_l$.

Figure 1B:
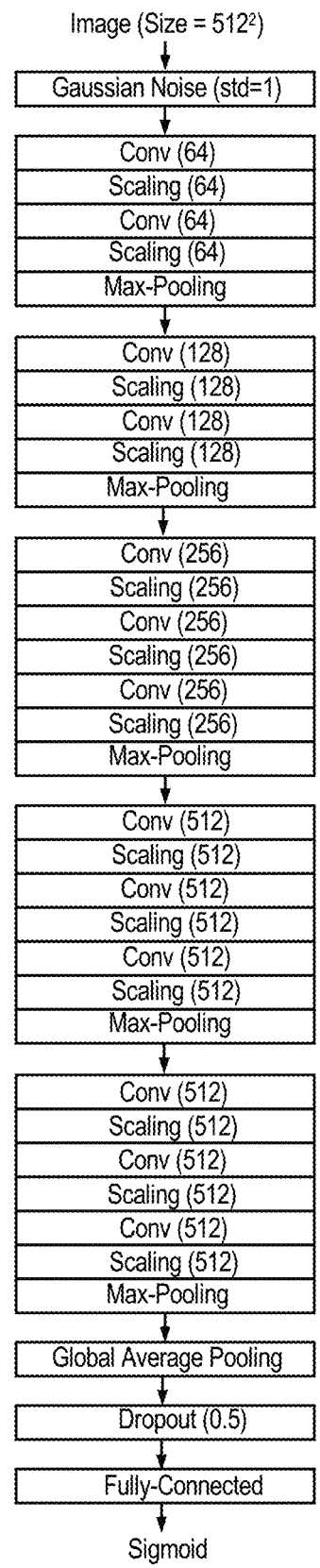
FIG. 1(B) is a diagram illustrating a network architecture with channel-scaling layers, in accordance with one embodiment of the present invention.

FIG. 1(A) is a diagram illustrating a baseline network architecture with pre-trained convolutional layers. FIG. 1(B) is a diagram illustrating a network architecture with channel-scaling layers, in accordance with one embodiment of the present invention. Both the network architectures have ImageNet pre-trained convolutional layers from VGG16 (13 convolutional layers, 4,224 feature channels), where ImageNet is an image database for visual object recognition software research and VGG16 is a convolutional neural network model. Conv($c_l$) are 3×3 convolutional layers with $c_l$ feature channels and ReLU (Rectified Linear Unit). Scaling($c_l$) are the corresponding channel-scaling layers. The convolutional layers are non-trainable, while channel-scaling layers and fully-connected layers are trainable.

After adding the channel-scaling layers, the last convolutional features are pooled by global average pooling and a trainable final fully-connected layer is used to provide the predictions. As the pre-trained convolutional layers are frozen, instead of millions of weights, only the c scaling weights of the channel-scaling layers and the weights of the final fully-connected layer need to be trained. The scaling weights in channel-scaling layers are fixed after training.

After a network augmented with channel-scaling layers is trained, $s_l$ can be used to remove the less important channels from the pre-trained convolutional layer l; for examples, those with the corresponding $s_{li} < 0.01$. Suppose the kernel shape of convolutional layer l is (k, k, $c_{l-1}$, $c_l$), with k the kernel size, and $c_{l-1}$ and $c_l$ are the numbers of input and output channels. If $n_{l-1}$ and $n_l$ channels are removed from the previous and this convolutional layers, respectively, the new kernel shape becomes (k, k, $c_{l-1} - n_{l-1}$, $c_l - n_l$). The corresponding layer biases are also removed accordingly. If all channels are removed from a layer, the layer and the subsequent convolutional layers are removed, though this did not happen in our experiments. Note that the remaining convolutional kernels are unaltered. After all layers are processed, the channel-scaling layers can be attached again and another iteration of training can be performed. This scale-and-select process iterates until some convergence criteria are fulfilled, for examples, reaching the maximum number of iterations or less than a number of channels can be removed.

To produce the final model after convergence, the feature channels are again removed according to $s_{li}$, but this time the remaining kernel weights are multiplied by the corresponding $s_{li}$. No channel-scaling layers are added and only the final fully-connected layer is trained to obtain the final model. The selected channels, with or without scaling, can be further used with other transfer learning methods to produce models of better performance.

Figure 2:
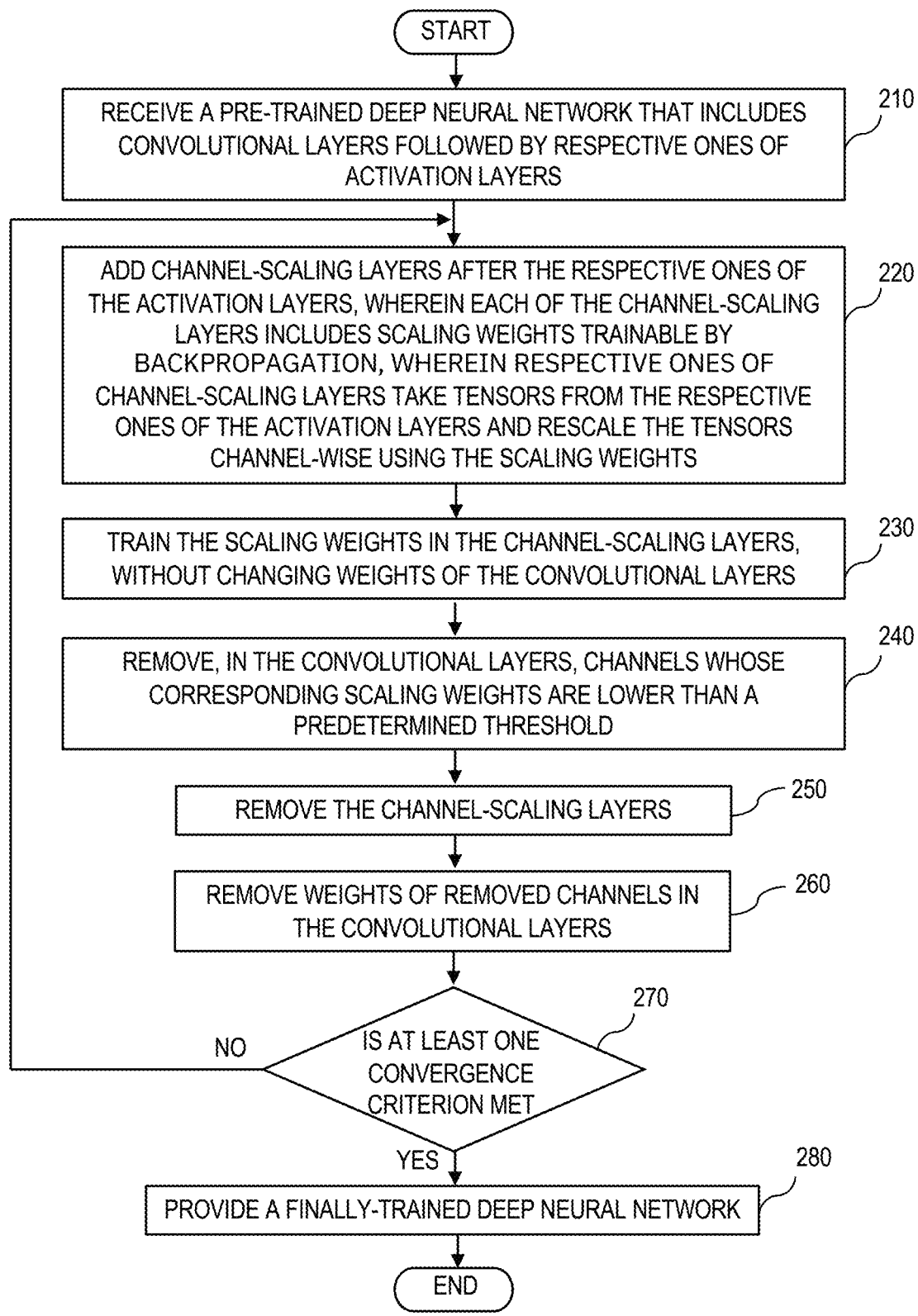
FIG. 2 presents a flowchart showing operational steps of introducing channel-scaling layers for network pruning in a deep neural network, in accordance with one embodiment of the present invention.

FIG. 2 presents a flowchart showing operational steps of introducing channel-scaling layers for network pruning in a deep neural network, in accordance with one embodiment of the present invention. The operational steps are implemented on one or more computing devices or servers. A computing device or server is described in more detail in later paragraphs with reference to FIG. 8. In another embodiment, the operational steps may be implemented on a virtual machine or another virtualization implementation being run on one or more computing devices or servers. In yet another embodiment, the operational steps may be implemented in a cloud computing environment. The cloud computing environment is described in later paragraphs with reference to FIG. 9 and FIG. 10.

At step 210, the computing device or server receives a pre-trained deep neural network that includes convolutional layers followed by respective ones of activation layers. An example of the pre-trained deep neural network is shown in FIG. 1(A), which includes 13 convolutional layers. Each of the convolutional layers has an activation layer.

At step 220, the computing device or server adds channel-scaling layers after the respective ones of the activation layers. Each of the channel-scaling layers includes scaling weights. The scaling weights are trainable by backpropagation. The scaling weights in a channel-scaling layers are corresponding to respective ones of channels in a convolutional layer preceding the channel-scaling layer. The number of the scaling weights in a channel-scaling layer is the same as the number of channels of an activation layer before the channel-scaling layer. Respective ones of the channel-scaling layers take tensors from the respective ones of the activation layers and rescale the tensors channel-wise using the scaling weights. In other words, a channel-scaling layer takes a tensor from an activation layer that is before the channel-scaling layer and rescales the tensor channel-wise using the scaling weights. In an example shown in FIG. 1(B), channel-scaling layers follows respective one of convolutional layers.

At step 230, the computing device or server trains the scaling weights in the channel-scaling layers, without changing weights of the convolutional layers. At step 240, the computing device or server removes, in the convolutional layers, channels whose corresponding scaling weights are lower than a predetermined threshold. A scaling weight in a channel-scaling layer corresponds to a channel in a convolutional layer that is before the channel-scaling; if the scaling weight corresponding to the channel is lower than the predetermined threshold, the channel will be removed.

At step 250, the computing device or server removes the channel-scaling layers. After certain channels in convolutional layers are removed due to scaling weights being lower than the predetermined threshold, all of the channel-scaling layers are removed. For example, the 13 channel-scaling layers shown in FIG. 1(B) are removed.

At step 260, the computing device or server removes weights of removed channels in the convolutional layers. Because of the channel removal at step 240, the weights of the removed channels are unnecessary anymore.

At step 270, the computing device or server determines whether at least one convergence criterion is met. In response to determining that at least one convergence criterion is met (YES branch of decision block 270), the computing device or server provide a finally trained deep neural network. By introducing channel-scaling layers, the pre-trained deep neural network is pruned and parameters are reduced for the finally trained deep neural network, while the finally trained deep neural network delivers a superior performance. In response to determining that least one convergence criterion is not met (NO branch of decision block 270), the computing device or server reiterates steps 220-270, until least one convergence criterion is met.

Using an ImageNet pre-trained VGG16 model, the capabilities of the proposed network on classifying opacity from chest X-ray images were examined in experiments. The results showed that the proposed network could reduce the number of parameters by 95% while delivering a superior performance. When channel-scale channels and L1 regularization were utilized, the proposed method delivered a network that only included 969 channels compared to the original 4,224 in VGG16.

The proposed network was validated on a publicly available dataset of chest radiographs, MIMIC-CXR (MIMIC Chest X-ray). Experiments focused on the binary classification of opacity. In the experiments, 254,806 frontal images were used with 201,168 positive and 53,638 negative cases. The dataset was split into 20% for training, 10% for validation, and 70% for testing in terms of patient ID with the positive to negative ratio maintained. Each image was resized to 512×512.

As a proof of the concept, the ImageNet pre-trained convolutional layers (13 convolutional layers, 4,224 feature channels) from VGG16 (shown in FIG. 1(A)) was used. The baseline network without channel-scaling layers (FIG. 1(A)) was obtained by training only the final fully-connected layer. The proposed network with channel-scaling layers (FIG. 1(B)) was validated. In addition, the L1 regularization (regularization parameter=$10^{-5}$) was used to increase the weights sparsity of the channel-scaling layers. In the channel selection process, the feature channels with the corresponding $s_{li}$<0.01 were removed.

Figure 3:
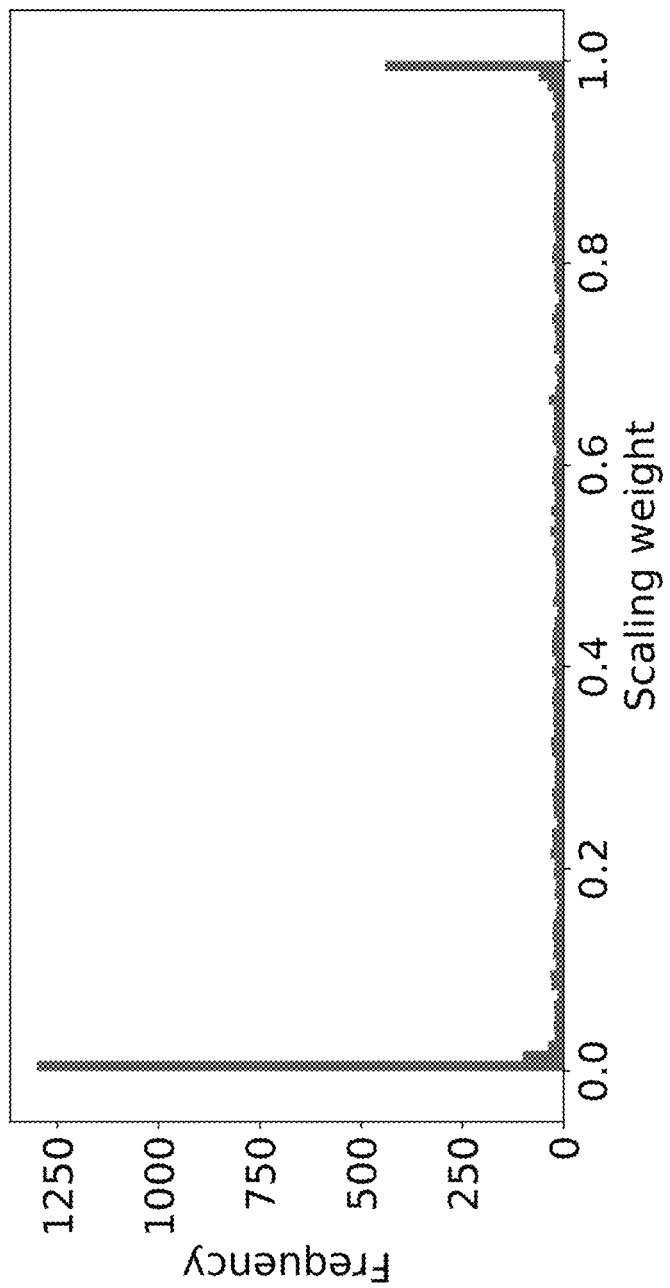
FIG. 3 presents a histogram of channel scaling weights after first training, in accordance with one embodiment of the present invention.

FIG. 3 presents a histogram of channel scaling weights after first training, in accordance with one embodiment of the present invention. When channel-scale channels and L1 regularization were utilized, among 4224 channel-scaling weights, there were 1,301 weights<0.01 and 441 weights>0.99.

Figure 4:
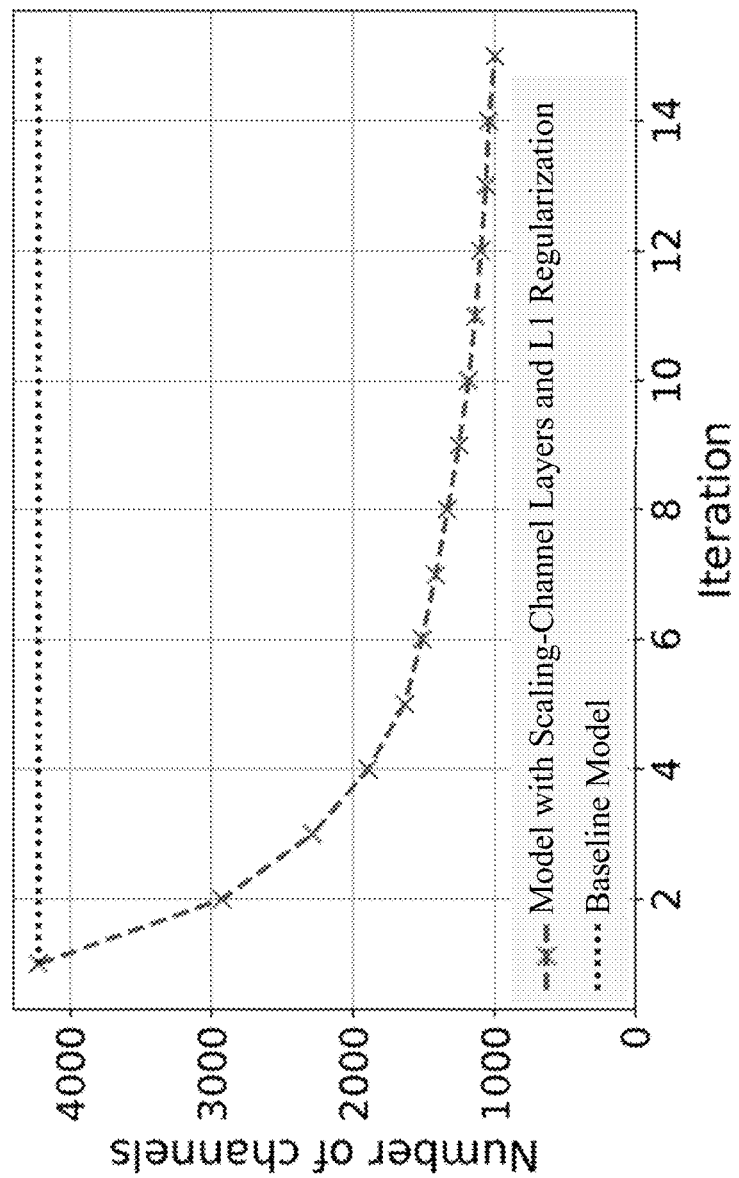
FIG. 4 presents the number of channels versus the number of iterations, in accordance with one embodiment of the present invention.

FIG. 4 presents the number of channels versus the number of iterations, in accordance with one embodiment of the present invention. With channel-scale channels and L1 regularization, the numbers of channels decreased with iterations; the rates of channel reduction slowed down with iterations and showed a sign of convergence.

Figure 5:
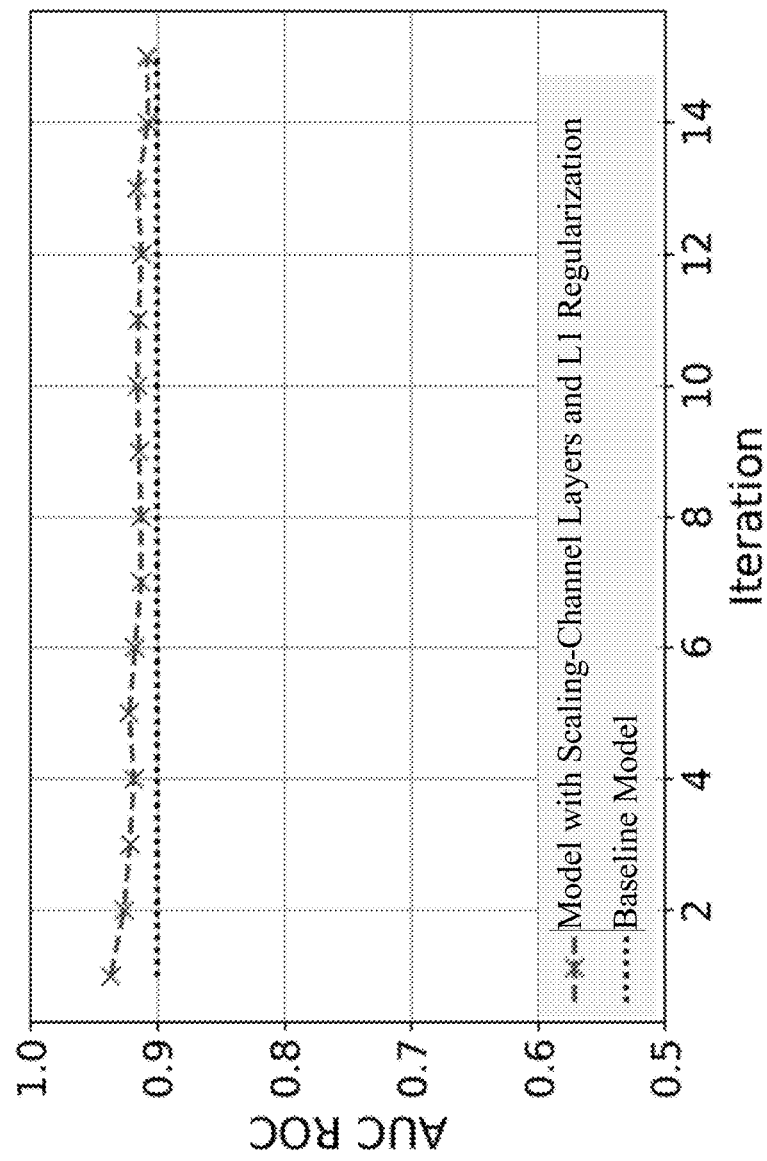
FIG. 5 presents AUC (area under curve) of ROC (receiver operating characteristic) curves versus the number of iterations, in accordance with one embodiment of the present invention.

FIG. 5 presents AUC (area under curve) of ROC (receiver operating characteristic) curves versus the number of iterations, in accordance with one embodiment of the present invention. The results showed that the proposed network with channel-scaling layers performed better than the baseline network even after 15 iterations.

Figure 6:
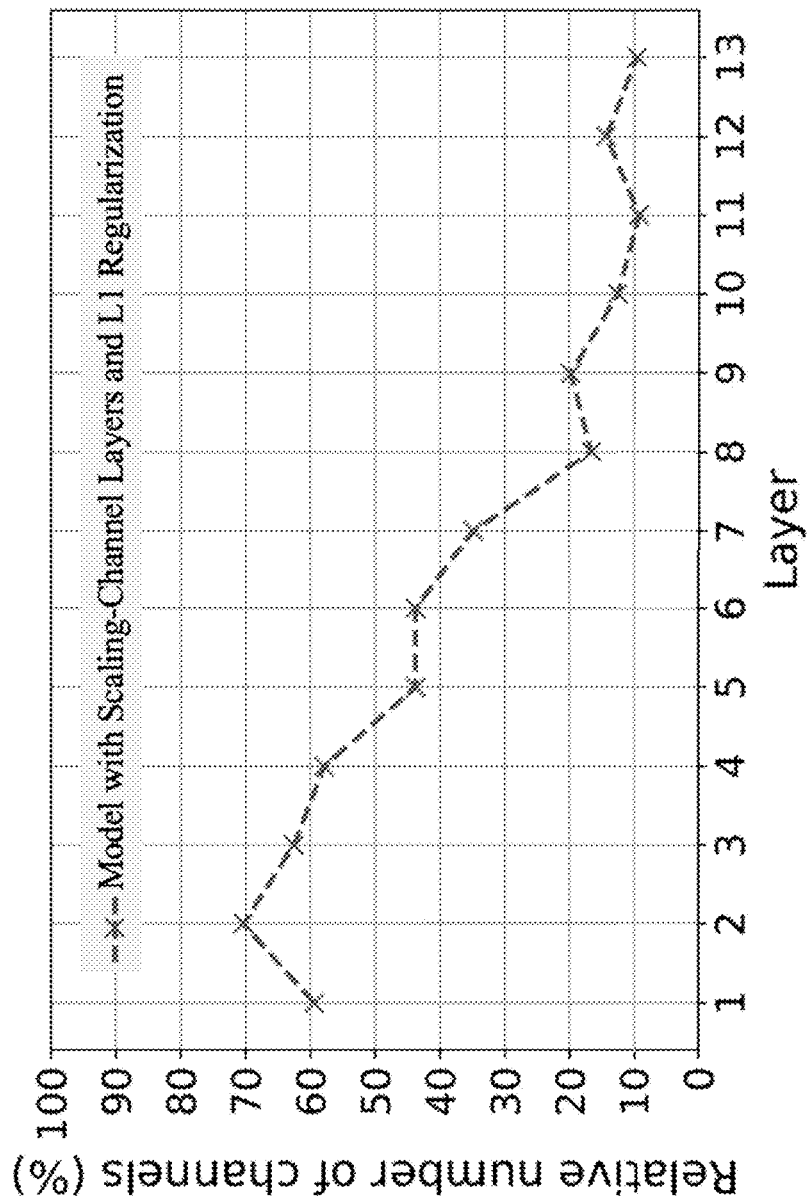
FIG. 6 presents the relative number of channels left for each convolutional layer with respect to a baseline network, in accordance with one embodiment of the present invention.

FIG. 6 presents the relative number of channels left for each convolutional layer with respect to the baseline network, in accordance with one embodiment of the present invention. After 15 iterations, there were 14.72 million parameters for the baseline network, while there were 0.67 million parameters for the proposed network with L1 regularization. The result showed that more low-level channels were kept in general, which was consistent with the findings that the high-level channels were more problem specific and less transferable.

Figure 7:
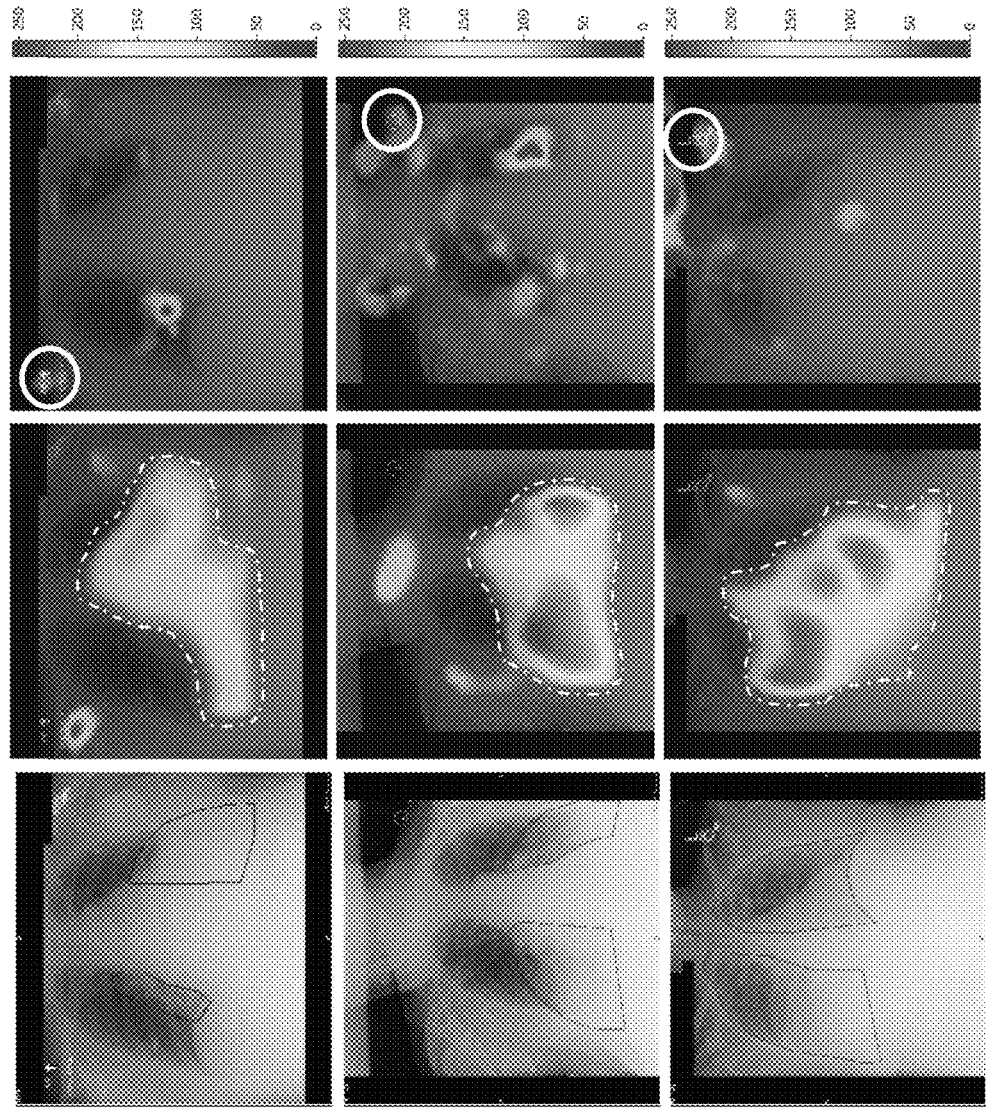
FIG. 7 presents examples of class activation maps of positive cases, in accordance with one embodiment of the present invention.

FIG. 7 presents examples of class activation maps of positive cases, in accordance with one embodiment of the present invention. The images were annotated by an expert for the regions of opacity (indicated by dashed lines in annotated images). Although all models correctly classified the cases as positives, the activation maps of the baseline network were barely correlated with the annotated regions, with more irrelevant hot spots outside the lungs. On the other hand, the activation maps of the proposed network were better correlated with the annotation. The hot spots in the images of using the proposed network are shown within dash-dotted lines. In other words, this smaller network seemed to be also more focused on the correct regions, which was a step towards explainability. The images of using the baseline network show that the VGG16 activation maps had important components outside the lungs, focusing on English characters on the images (shown within circles), whereas the proposed network showed more activation in marked areas of the lungs.

The experimental results showed that using the channel-scaling layers and scaling-and-select strategy, the number of feature channels could be reduced with minimal effects on the classification performance. Furthermore, explainability could also be improved by removing unnecessary feature channels. Applying L1 regularization could lead to faster and more network size reduction, but with the tradeoff of the classification performance. Different hyperparameters such as the value of the regularization parameter and the threshold value of $s_{ji}$ for channel selection could be further adjusted for better tradeoff. Furthermore, because of the relatively small number of trainable network parameters (4,737 at the first iteration), the proposed network could use only 20% of data for training.

Figure 8:
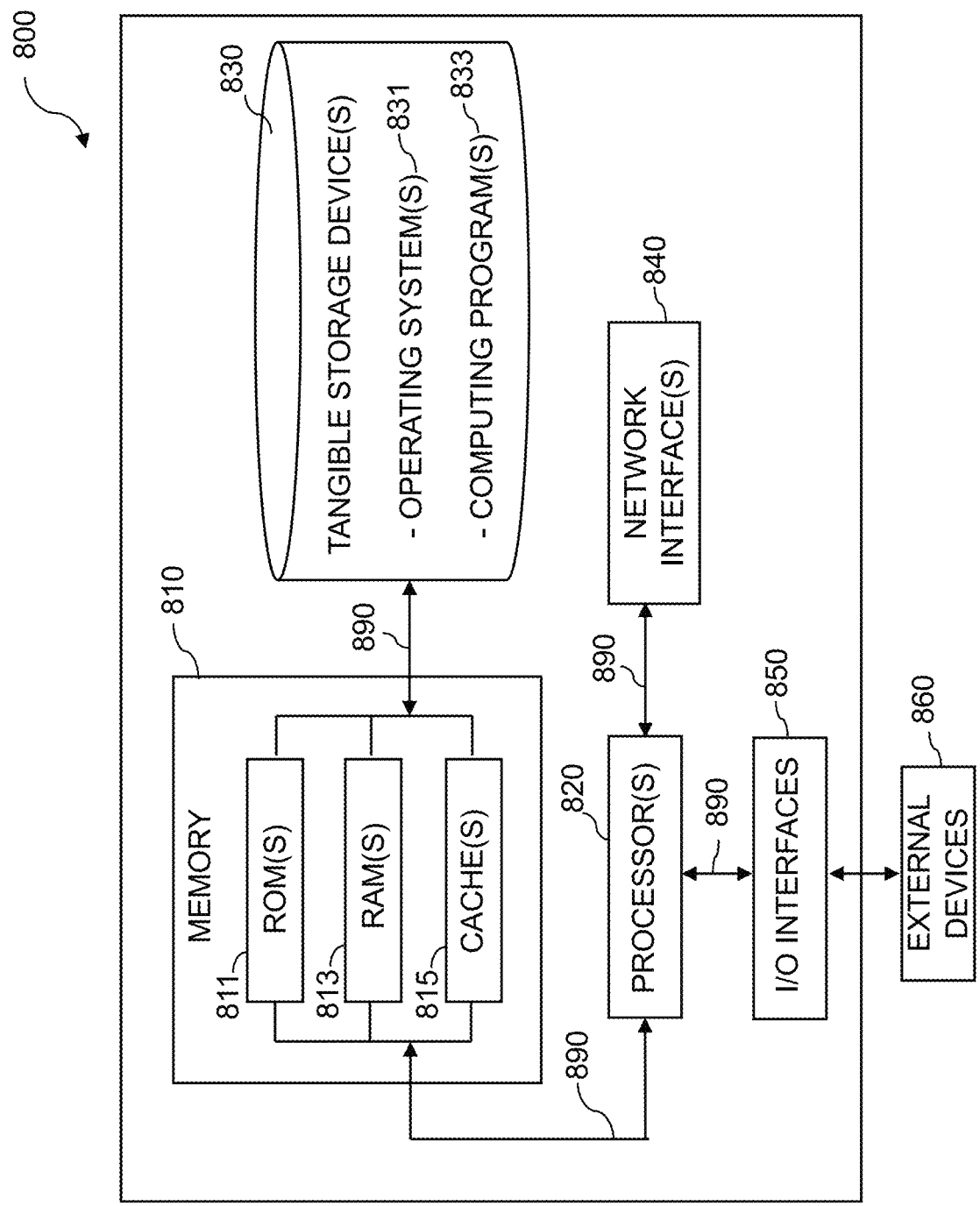
FIG. 8 is a diagram illustrating components of a computing device or a server, in accordance with one embodiment of the present invention.

FIG. 8 is a diagram illustrating components of a computing device or a server, in accordance with one embodiment of the present invention. It should be appreciated that FIG. 8 provides only an illustration of one implementation and does not imply any limitations with regard to the environment in which different embodiments may be implemented.

Referring to FIG. 8, computing device or server 800 includes processor(s) 820, memory 810, and tangible storage device(s) 830. In FIG. 8, communications among the above-mentioned components of computing device or server 800 are denoted by numeral 890. Memory 810 includes ROM(s) (Read Only Memory) 811, RAM(s) (Random Access Memory) 813, and cache(s) 815. One or more operating systems 831 and one or more computer programs 833 reside on one or more computer readable tangible storage device(s) 330.

Computing device or server 800 further includes I/O interface(s) 850. I/O interface(s) 850 allows for input and output of data with external device(s) 860 that may be connected to computing device or server 800. Computing device or server 800 further includes network interface(s) 840 for communications between computing device or server 800 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
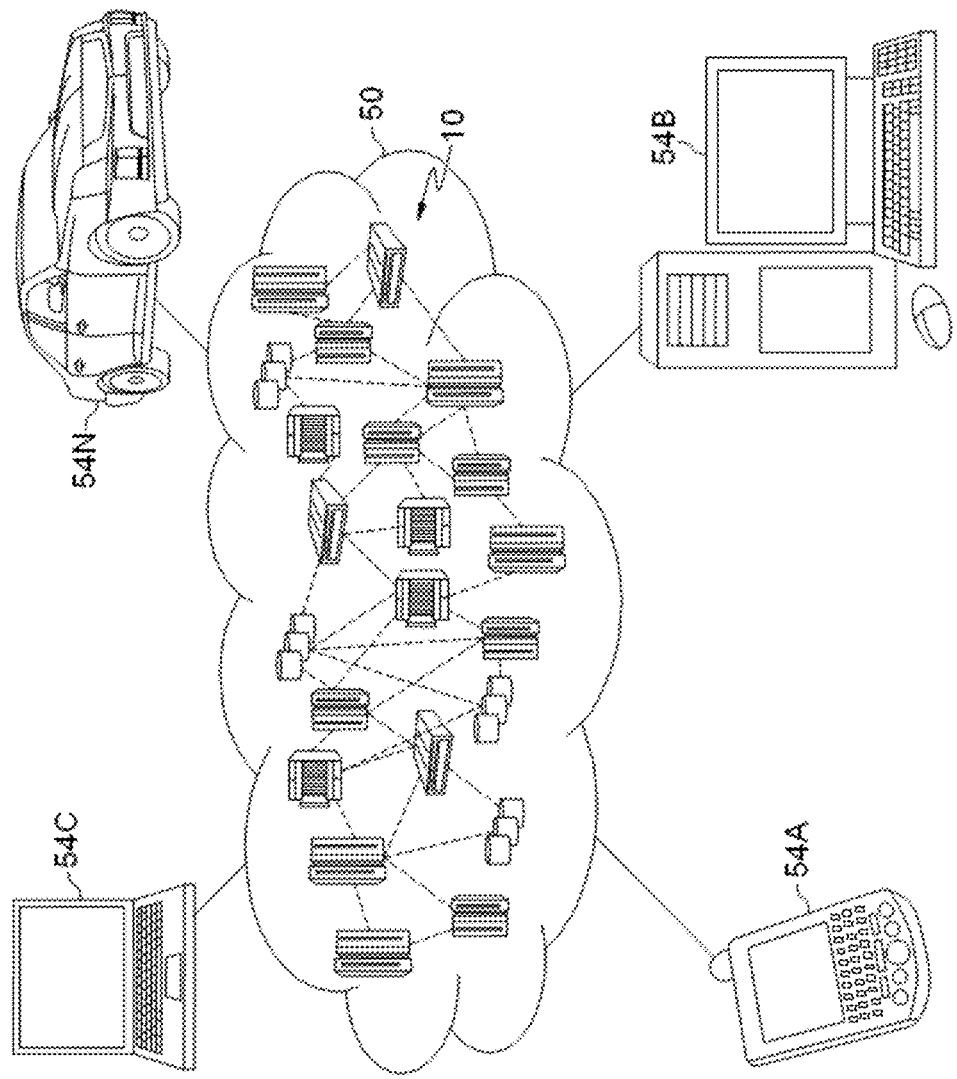
FIG. 9 depicts a cloud computing environment, in accordance with one embodiment of the present invention.

Referring now to FIG. 9, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 10:
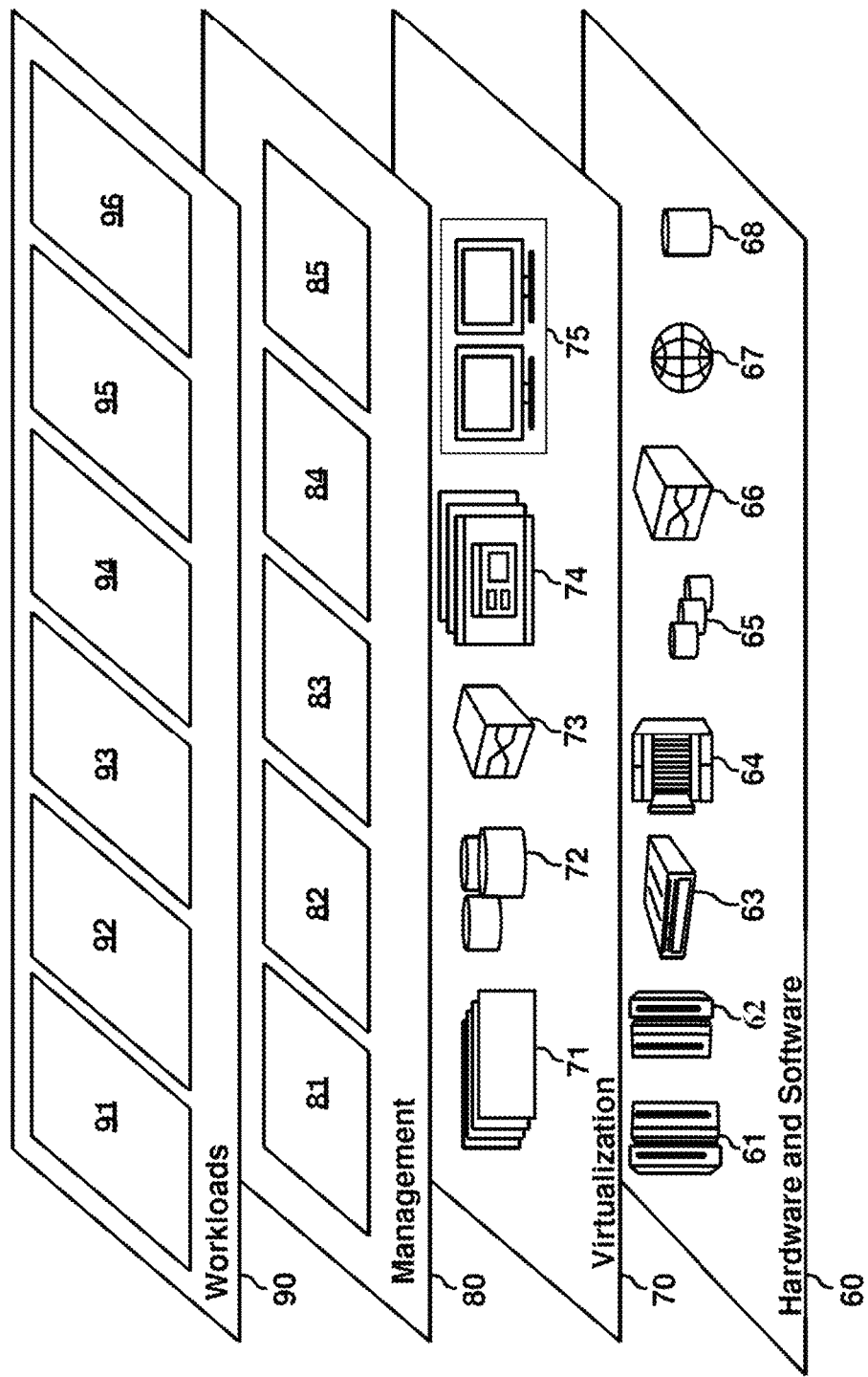
FIG. 10 depicts abstraction model layers in a cloud computing environment, in accordance with one embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of introducing channel-scaling layers for network pruning in a deep neural network.

What is claimed is:

1. A computer-implemented method for introducing channel-scaling layers in a deep neural network, the method comprising:
receiving a pre-trained deep neural network, the pre-trained deep neural network including non-trainable convolutional layers, the convolutional layers followed by respective ones of activation layers;
adding channel-scaling layers after the respective ones of the activation layers, each of the channel-scaling layers including scaling weights;
pooling last convolutional features so that a trainable final fully-connected layer is used to provide predictions after adding the channel-scaling layers;
training the scaling weights in the channel-scaling layers without changing weights of the convolutional layers;
training weights of the final fully-connected layer;
removing, in the convolutional layers, channels whose corresponding scaling weights are lower than a predetermined threshold;
removing the channel-scaling layers; and
in response to determining that at least one convergence criterion is met, providing a finally trained deep neural network with a reduction of channels and parameters to enable transfer learning that allows feature channel selections without changing values of original weights of the finally trained deep neural network.

2. The computer-implemented method of claim 1, further comprising:
in response to determining that the at least one convergence criterion is not met, reiterating a process of adding the channel-scaling layers, training the scaling weights, removing the channels, and removing the channel-scaling layers, until the at least one convergence criterion is met.

3. The computer-implemented method of claim 1, further comprising:
   removing weights of removed channels in the convolutional layers.

4. The computer-implemented method of claim 1, further comprising:
   applying L1 regularization on channel-scaling layers.

5. The computer-implemented method of claim 1, wherein respective ones of the channel-scaling layers take tensors from the respective ones of activation layers, and wherein the respective ones of the channel-scaling layers rescale the tensors channel-wise, using the scaling weights.

6. The computer-implemented method of claim 1, wherein the scaling weights are trainable by backpropagation.

7. A computer program product for introducing channel-scaling layers in a deep neural network, the computer program product comprising a computer readable storage medium having program instructions embodied therewith, the program instructions executable by one or more processors, the program instructions executable to:
   receive a pre-trained deep neural network, the pre-trained deep neural network including non-trainable convolutional layers, the convolutional layers followed by respective ones of activation layers;
   add channel-scaling layers after the respective ones of the activation layers, each of the channel-scaling layers including scaling weights;
   pool last convolutional features so that a trainable final fully-connected layer is used to provide predictions after adding the channel-scaling layers;
   train the scaling weights in the channel-scaling layers without changing weights of the convolutional layers;
   train weights of the final fully-connected layer;
   remove, in the convolutional layers, channels whose corresponding scaling weights are lower than a predetermined threshold;
   remove the channel-scaling layers; and
   in response to determining that at least one convergence criterion is met, provide a finally trained deep neural network with a reduction of channels and parameters to enable transfer learning that allows feature channel selections without changing values of original weights of the finally trained deep neural network.

8. The computer program product of claim 7, further comprising the program instructions executable to:
   in response to determining that the at least one convergence criterion is not met, reiterate a process of adding the channel-scaling layers, training the scaling weights, removing the channels, and removing the channel-scaling layers, until the at least one convergence criterion is met.

9. The computer program product of claim 7, further comprising the program instructions executable to:
   remove weights of removed channels in the convolutional layers.

10. The computer program product of claim 7, further comprising the program instructions executable to:
    apply L1 regularization on channel-scaling layers.

11. The computer program product of claim 7, wherein respective ones of the channel-scaling layers take tensors from the respective ones of activation layers, and wherein the respective ones of the channel-scaling layers rescale the tensors channel-wise, using the scaling weights.

12. The computer program product of claim 7, wherein the scaling weights are trainable by backpropagation.

13. A computer system for introducing channel-scaling layers in a deep neural network, the computer system comprising:
    one or more processors, one or more computer readable tangible storage devices, and program instructions stored on at least one of the one or more computer readable tangible storage devices for execution by at least one of the one or more processors, the program instructions executable to:
    receive a pre-trained deep neural network, the pre-trained deep neural network including non-trainable convolutional layers, the convolutional layers followed by respective ones of activation layers;
    add channel-scaling layers after the respective ones of the activation layers, each of the channel-scaling layers including scaling weights;
    pool last convolutional features so that a trainable final fully-connected layer is used to provide predictions after adding the channel-scaling layers;
    train the scaling weights in the channel-scaling layers without changing weights of the convolutional layers;
    train weights of the final fully-connected layer;
    remove, in the convolutional layers, channels whose corresponding scaling weights are lower than a predetermined threshold;
    remove the channel-scaling layers; and
    in response to determining that at least one convergence criterion is met, provide a finally trained deep neural network with a reduction of channels and parameters to enable transfer learning that allows feature channel selections without changing values of original weights of the finally trained deep neural network.

14. The computer system of claim 13, further comprising the program instructions executable to:
    in response to determining that the at least one convergence criterion is not met, reiterate a process of adding the channel-scaling layers, training the scaling weights, removing the channels, and removing the channel-scaling layers, until the at least one convergence criterion is met.

15. The computer system of claim 13, further comprising the program instructions executable to:
    remove weights of removed channels in the convolutional layers.

16. The computer system of claim 13, further comprising the program instructions executable to:
    apply L1 regularization on channel-scaling layers.

17. The computer system of claim 13, wherein respective ones of the channel-scaling layers take tensors from the respective ones of activation layers, and wherein the respective ones of the channel-scaling layers rescale the tensors channel-wise, using the scaling weights.

18. The computer system of claim 13, wherein the scaling weights are trainable by backpropagation, wherein training the scaling weights is without changing weights of the convolutional layers.

* * * * *